Oct. 14, 1924.  
H. J. MURRAY  
1,511,232  
CLUTCH RING SYNCHRONIZING DEVICE  
Filed March 30, 1922
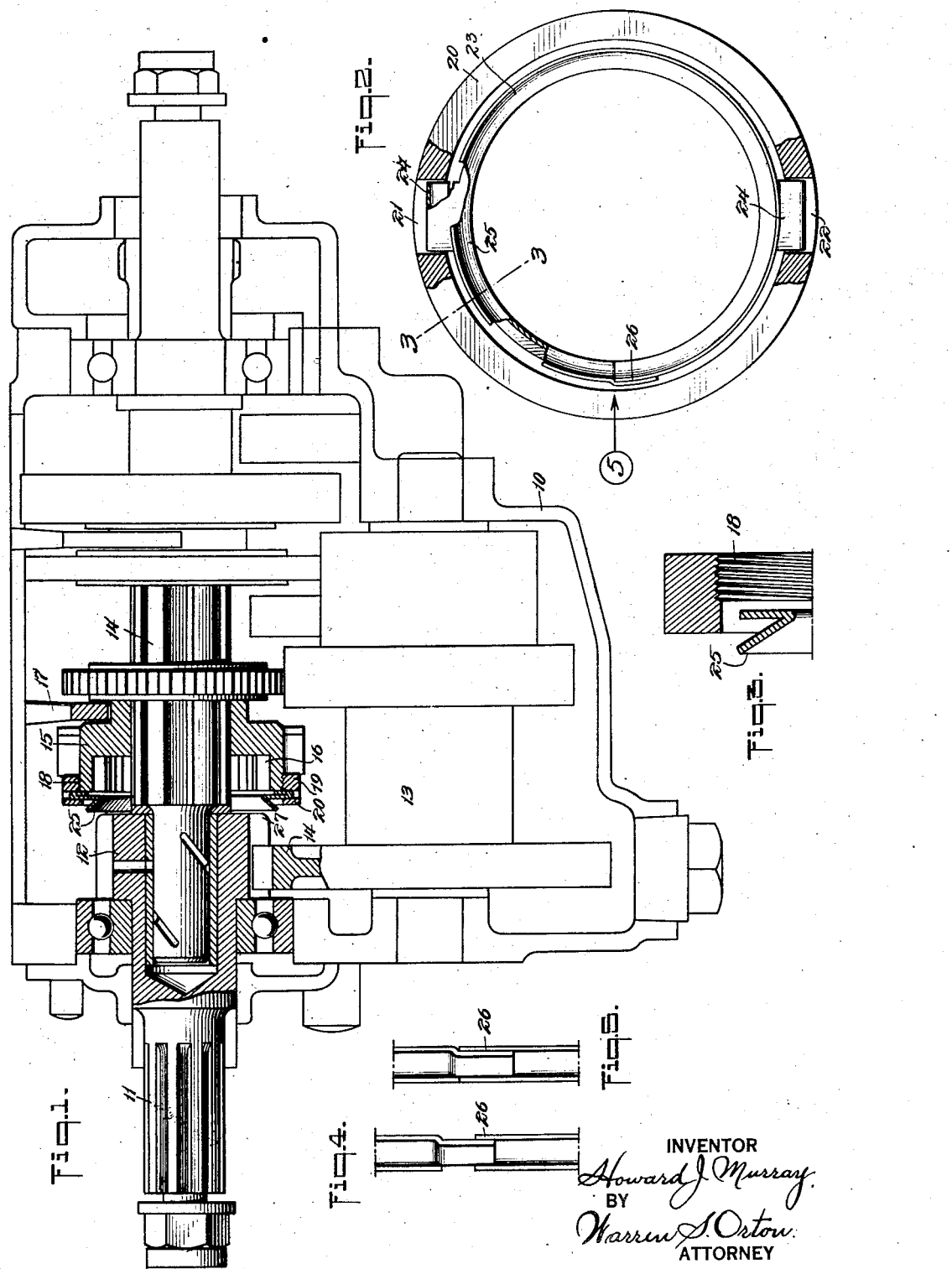
INVENTOR  
Howard J. Murray  
BY  
Warren S. Orton  
ATTORNEY Patented Oct. 14, 1924.

1,511,232

UNITED STATES PATENT OFFICE.

HOWARD J. MURRAY, OF NEW YORK, N. Y.

CLUTCH-RING SYNCHRONIZING DEVICE.

Application filed March 30, 1922. Serial No. 548,236.

*To all whom it may concern:*

Be it known that I, HOWARD J. MURRAY, a citizen of the United States, and resident of New York city, in the county of Kings and State of New York, have invented certain new and useful Improvements in Clutch-Ring Synchronizing Devices, of which the following is a specification.

The invention relates to a synchronizing device for causing a pair of clutch members to approach the same speed before they are moved into, or just prior to being moved into, meshing or inter-driving relation.

The present application is to be regarded as a companion case with applications, Serial Nos. 548,235 and 548,237 filed under even date and entitled Power transmission mechanism and sliding clutch gear synchronizer, respectively.

The invention herein disclosed specifically relates to a synchronizing device for use in those situations where the clutch elements, herein shown to be gears are moved relative to each other along the same axis of rotation and as an illustration of one situation where a synchronizer of this type is particularly effective the invention will be described in connection with the coupling of the power shaft with the propeller shaft in the transmission casing of an automotive vehicle structure in effecting the usual direct driving relation.

The primary object of the invention is to provide a simple form of synchronizing device which can be carried by one of the clutch elements or gear units and designed to be engaged by the other element or unit in the relative meshing movement of the units in such way as will cause one of the units to approach the speed of the other unit and then to be moved into an inoperative position automatically as the gears move into their positive meshing engagement.

The invention contemplates the use of a resilient clutching element carried by one of the gears, disposed in the path of movement of the other gear in its meshing movement and arranged so as to provide a temporary friction drive, and which will give under the force of the continued movement of the gear into its clutching position and be forced into an inoperative position thus permitting the gears to mesh.

A further object of the invention is to provide a simple form of synchronizing device which can be made up of a simple stamping thus featuring economy in manufacturing costs, and which can be mounted on conventional gear structures without materially modifying conventional forms of these parts or requiring any separate mountings or actuating or controlling parts distinct from the usual parts for shifting the gears themselves.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawings:

Figure 1 is a view largely in diagrammatic outline of a conventional form of power transmission equipped with a synchronizing device constituting a preferred embodiment of the invention;

Figure 2 is an enlarged end view of the sliding gear shown in full lines in Figure 1 and with parts broken away to show internal construction;

Figure 3 is a transverse sectional view taken on the line 3—3 of Figure 2; and

Figures 4 and 5 are detailed views in plan showing the part of the split ring at its lapped joint indicated at the arrow 5 in Figure 2; Figure 4 showing the position of the parts when the joint is distended and Figure 5 showing the joint with the ring in its normal collapsed position.

In the following description and in the claims, parts will be identified by specific names for convenience of expression but they are intended to be as generic in their application to similar parts as the art will permit.

In the drawings there is shown a transmission casing 10 of conventional form and more particularly described in the above identified copending applications. There is shown the usual power shaft 11 for driving the main driving gear 12 which drives the countershaft 13 through the gear 14. The gear 12 will be referred to hereinafter as the plug member of the clutch. The propeller shaft 14 which aligns with the power shaft 11 is provided with a gear unit 15 keyed thereto. The unit 15 includes an internal gear 16, referred to hereinafter as the socket member of the clutch, and into which telescopes the plug 12 as the unit 15 is shifted from right to left of the position shown in Figure 1 by the control mechanism 17, all as is well known in devices of the character herein disclosed. The gear unit 15 resembles the similar structure now known in a well known form of transmission mechanism except that it is provided on the end facing the gear 12 with threads 18 on which is screwed the synchronizer 19 particularly forming the subject-matter of this disclosure. The synchronizer includes a ring 20 provided with a pair of diametrically disposed and radially extending slots 21 and 22. Mounted within the ring 20 is a resilient ring 23 provided at diametrically opposite sides with a pair of guiding lugs 24 which fit in the slots 21 and 22 and are designed to move radially relative to the axis of rotation of the unit 15, but are held thereby against relative rotary movement. The ring 23 includes a frusto-conical member 25 with a lapped joint 26. The face 25 provides a bearing face and thus provides an element of a friction clutch which is designed to be engaged by the bevelled end 27 of the teeth forming the plug 12.

In operation it will be understood that as the gear unit 15 is shifted to the left it will bring the bevelled face of the split ring into bearing engagement with the plug 12 thus providing a friction drive between the plug 12 and the socket carrying unit 15 and effecting a direct friction drive between the shafts 11 and 14. As the unit 15 continues to move to the left the bearing engagement of the bevelled end of the plug 12 against the face of the ring will cause the split ring to expand. This expansion is permitted by the fact that the ring is split and the parts constituting the end of the ring are capable of moving from the position shown in Figure 5 into the position shown in Figure 4. This distension of the ring will permit the same to enlarge to the diameter of the plug 12 and with the continued movement of the unit 15, the plug 12 will telescope through the inner periphery of the split ring and move into positive meshing engagement with the teeth of the socket member 16. In this way it will be understood that when the clutch members are in intermeshed driving engagement the resilient ring will be held in distended position and encircle the plug 12.

As the members are moved into unclutched position the resiliency of the ring will cause it to collapse into the normal position shown in Figure 2.

Having thus described my invention, I claim:

1. In a clutch of the plug and socket type, the combination of a plug member having external teeth beveled at one end, a socket member adapted to receive the beveled end of the plug member when moved axially into telescopic intermeshing relation, a one-piece split ring carried by the end of the socket member facing the beveled end of the plug member, encircling the axis of rotation of the plug member, fixed to the socket member against relative rotary movement about said axis and provided with a beveled outer face adapted to be engaged by the beveled end of the plug member to provide a friction drive between the members, said ring being expandable transversely of the axis of rotation of the members to permit the plug member to pass into the same and to permit the forward beveled end of the plug member to pass therethrough and into meshing engagement with the socket member.

2. In a device of the class described, the combination of a pair of inter-engaging clutch members having a common axis of rotation and movable axially relative to each other to and from an intermeshing position, means between the members for causing them to approach the same speed before they assume said intermeshing position, said means including a single resilient split ring carried by one of the members and having an outturned flange at one end constituting a beveled periphery adapted to be engaged by the other member to form a bearing connection between the members before they are moved into their intermeshing position.

3. In a device of the class described, the combination of a pair of interengaging clutch members movable axially relative to each other to and from an intermeshing position, means between the members for causing them to approach the same speed before they assume said intermeshing position, said means including a clutch member in the form of a single split resilient ring of sheet-metal with its inner periphery defining a frusto-conical bearing face adapted to be engaged by one of the members and moved by the member into an expanded position to permit the advanced portion of said member to pass therethrough and into its intermeshing relation with the other member.

4. In a device of the class described, the combination of a pair of clutch members movable axially relative to each other to and from an intermeshing position, means between the members for causing them to approach the same speed before they assume said intermeshing position, said means including a resilient stamping secured to one of the members to rotate therewith and provided with a frusto-conical bearing face adapted to be engaged by the other member to form a clutching connection between the members and permitted by its resiliency to be moved positively by said other member into a non-clutching position.

5. In a device of the class described, the combination of a pair of clutch members, movable axially relative to each other to and from an intermeshing position, means between the members for causing them to approach the same speed before they assume said intermeshing position, said means including a one-piece ring, a lug and slot connection for securing the ring to one of the members to rotate therewith and said ring provided with a frusto-conical bearing face adapted to be engaged by the other member to form a clutching connection between the members, said ring being resilient radially and movable under the pressure from said engaging member into an inoperative position incapable of transmitting rotary torque.

6. In a device of the class described, the combination of interengaging clutch elements movable relative to each other axially into telescopic meshing engagement, the end of one of the elements facing the other element provided with a slotted ring, a split resilient ring provided with extensions fitted loosely in said slotted ring to turn with its associated element and having a limited freedom of radial movement in said slotted ring, said means having a clutch face adapted to be engaged by the adjacent end of the other element to provide a friction drive between the elements, said ring means being distortable transversely of the axis of the elements to permit said other element to pass thereby in its movement into intermeshing position.

7. In a device of the class described, the combination of a driving and a driven member movable relative to each other, a one-piece resilient split ring constituting an expandible clutch member carried by one of the members normally disposed in the path of said other member and adapted to be engaged by the other member to provide a temporary driving connection between the members, said clutch member having an opening therethrough adapted to be expanded radially for permitting said other member to pass beyond its position engaging the clutch member and said clutch member capable of being expanded into a non-torque transmitting position under pressure from said other member and maintained by said other member under tension and capable inherently of resuming its normal position automatically when free of said other member.

8. In a device of the class described, the combination of a gear fixed axially and constituting the plug element of a clutch, a shaft axially aligned with said gear, a member slidable on the shaft and provided on the side facing the plug element with a socket for receiving the plug element, synchronizing means carried by the shiftable member, disposed in advance of the socketed side and adapted to engage the plug element to cause the plug element and said socketed member to approach the same speed before the plug element is moved into the socket and a control mechanism directly engaging the shiftable member to shift the same and incidentally to cause the synchronizing means to function automatically as the member is shifted towards the plug element.

Signed at New York city, in the county of New York and State of New York, this 27th day of March, A. D. 1922.

HOWARD J. MURRAY.